United States Patent
Matwey

(10) Patent No.: US 9,359,950 B2
(45) Date of Patent: Jun. 7, 2016

(54) GAS TURBINE ENGINES HAVING PLASMA FLOW-CONTROLLED INTAKE SYSTEMS

(71) Applicant: HONEYWELL INTERNATIONAL INC., Morristown, NJ (US)

(72) Inventor: Mark Matwey, Phoenix, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 436 days.

(21) Appl. No.: 13/898,275

(22) Filed: May 20, 2013

(65) Prior Publication Data
US 2014/0338333 A1 Nov. 20, 2014

(51) Int. Cl.
*F01D 5/14* (2006.01)
*F04D 29/22* (2006.01)
*F04D 29/68* (2006.01)
(Continued)

(52) U.S. Cl.
CPC ................. *F02C 7/057* (2013.01); *B64C 21/04* (2013.01); *F01D 5/145* (2013.01); *F04D 29/2272* (2013.01); *F04D 29/684* (2013.01); *F04D 29/687* (2013.01); *F15D 1/008* (2013.01); *F15D 1/0095* (2013.01); *B64C 2230/12* (2013.01); *F05D 2220/50* (2013.01); *F05D 2250/232* (2013.01); *F05D 2270/17* (2013.01); *F05D 2270/172* (2013.01)

(58) Field of Classification Search
CPC .......... F05D 2270/17; F05D 2270/172; F01D 5/145; F04D 29/2272; F04D 2/684; F04D 29/687; B64C 21/04; B64C 2230/12; F15D 1/008; F15D 1/0095
See application file for complete search history.

(56) References Cited

U.S. PATENT DOCUMENTS 7,637,455 B2   12/2009   Silkey et al.
7,870,720 B2   1/2011    Hagseth et al.
(Continued)

FOREIGN PATENT DOCUMENTS

FR          2964357 A1       3/2012
WO       2007106863 A2       9/2007
(Continued)

OTHER PUBLICATIONS

University of Iowa, "Flow Separation", 2009, University of Iowa, 1-3, 7, and 10 www.engineering.uiowa.edu/~me_160/lecture_notes/BLseperation1_2009.ppt.*
(Continued)

*Primary Examiner* — Phutthiwat Wongwian
*Assistant Examiner* — William Breazeal
(74) *Attorney, Agent, or Firm* — Ingrassia Fisher & Lorenz, P.C.

(57) ABSTRACT

Embodiments of a Gas Turbine Engine ("GTE") are provided, as are embodiments of a plasma flow-controlled intake system for deployment on a GTE. In one embodiment, the GTE includes a turbine section, a combustion section upstream of the turbine section, a compressor section upstream of the combustion section, and intake section upstream of the compressor section. The intake section includes a plenum, a first inlet fluidly coupled to the plenum, and a flow-obstructing structure projecting into the plenum and having an outer surface impinged by the airflow directed into the plenum through the first inlet during operation of the GTE. A first array of plasma actuators is disposed on flow-obstructing structure and, when activated, suppresses vortex shedding of the air flowing over the outer surface of the flow-obstructing structure.

19 Claims, 5 Drawing Sheets

(51) Int. Cl.
*B64C 21/04* (2006.01)
*F15D 1/00* (2006.01)
*F02C 7/057* (2006.01)

(56) References Cited

U.S. PATENT DOCUMENTS

| | | | |
|---|---|---|---|
| 7,984,614 B2 | 7/2011 | Nolcheff | |
| 8,282,336 B2 | 10/2012 | Wadia et al. | |
| 8,282,337 B2 | 10/2012 | Wadia et al. | |
| 8,348,592 B2 | 1/2013 | Wadia et al. | |
| 2005/0158173 A1 | 7/2005 | Nguyen et al. | |
| 2009/0169363 A1 | 7/2009 | Wadia et al. | |
| 2009/0169367 A1* | 7/2009 | Wadia | F02K 3/06 415/151 |
| 2010/0170224 A1 | 7/2010 | Clark et al. | |
| 2010/0172747 A1* | 7/2010 | Clark | F01D 5/143 415/177 |
| 2011/0048025 A1 | 3/2011 | Ginn et al. | |
| 2012/0152198 A1 | 6/2012 | Kim et al. | |
| 2012/0291874 A1 | 11/2012 | Tanaka et al. | |

FOREIGN PATENT DOCUMENTS

| | | |
|---|---|---|
| WO | 2008058011 A2 | 5/2008 |
| WO | 2009108237 A1 | 9/2009 |

OTHER PUBLICATIONS

EP Examination Report for Application No. 14166488.8 dated Sep. 5, 2014.
EP Search Report for Application No. 14166488.8 dated Aug. 19, 2014.
Vo H D, "Control of rotating stall in axial compressors using plasma actuators", AIAA Fluid and Dynamics Conference, XX,XX, vol. 37, Jun. 25, 2007, pp. 1-15 XP009112651.
Wikipedia Contributors, "Plasma (physics)", Internet Citation, Feb. 24, 2009, pp. 1-16, XP007907356, Retrieved from the internet: URL: http://en.wikipedia.orglw/ index.php?title=Plasma_( physics) &oldid=272932906 [retrieved on Feb. 24, 2009].
Thomas, F.O. et al.; Plasma Actuators for Bluff Body Flow Control, Center for Flow Physics and Control, University of Notre Dame, IN; American Institute of Aeronautics and Astronautics.
Thomas, F.O. et al.; Plasma Actuators for Cylinder Flow Control and Noise Reduction, University of Notre Dame, IN; AIAA Journal, vol. 46, No. 8, Aug. 2008.
Thomas, F.O. et al.; Optimization of Dielectric Barrier Discharge Plasma Actuators for Active Aerodynamic Flow Control, University of Notre Dame, IN; AIAA Journal, vol. 47, No. 9, Sep. 2009.
Kearney-Fischer, M. et al.; Noise Control of a High Reynolds No. Mach 0.9 Heated Jet Using Plasma Actuators, Gas Dynamics and Turbulence Laboratory Department of Mechanical Engineering, Ohio State University, OH; 15th AIAA/CEAS Aeroacoustics Conference (30th AIAA Aeroacoustics Conference) 2009-3188,May 11-13, 2009, FL.
Corke, T.C. et al.; Sensing and Control of Flow Separation Using Plasma Actuators, Philosophical Transactions of the Royal Society A: Mathematical, Physical and Engineering Sciences; http://rsta.royalsocietypublishing.org/content/369/1940/1459.short.
Jukes, T.N. et al.; Long Lasting Modifications to Vortex Shedding Using a Short Plasma Excitation, Faculty of Engineering, University of Nottingham, UK; http://prl.aps.org/abstract/PRL/v102/i25/e254501.
Jukes, T.N. et al.; Flow Control Around a Circular Cylinder Using Pulsed Dielectric Barrier Discharge Surface Plasma, Faculty of Engineering, University of Nottingham, UK; http://pof.aip.org/resource/1/phfle6/v21/i8/p084103_sl?isAuthorized=no.
Moreau, E; Airflow Control by Non-Thermal Plasma Actuators, Journal of Physics D: Applied Physics; 2007 J. Phys. D: Appl. Phys. 40 605 doi:10.1088/0022-3727/40/3/S01.

* cited by examiner

GAS TURBINE ENGINES HAVING PLASMA FLOW-CONTROLLED INTAKE SYSTEMS

TECHNICAL FIELD

The present invention relates generally to turbomachines and, more particularly, to auxiliary power units and other types of gas turbine engine having plasma flow-controlled intake systems, which stabilize airflow conditions within the engine's intake section to improve engine performance.

BACKGROUND

Auxiliary Power Units ("APUs") are a type of Gas Turbine Engine ("GTE") commonly deployed onboard aircraft and utilized for any one of a number of non-propulsive purposes, such to provide power during Main Engine Start, to produce electricity by driving generators, to drive other components on the aircraft (e.g., pumps), and/or to provide cooling airflow. As do GTEs, generally, an APU typically includes an intake section, a compressor section, a combustion section, a turbine section, and an exhaust section arranged in flow series. During APU operation, airflow is received within the intake section, compressed within the compressor section, and then mixed with fuel and ignited within the combustion section. The combustive gases are then expanded through the turbine or turbines within the turbine section to drive the rotation thereof and thereby provide the power output of the APU. Finally, the combustive gases may be expelled from the APU through the exhaust section.

The performance of an APU is dependent upon a number of factors. One factor affecting APU performance is the range over which the compressor(s) included within the APU compressor section can operate without surge (referred to herein as the "surge-free operational range"). The surge-free operational range of the compressor may, in turn, be affected by the flow structure or conditions within the APU intake section and, specifically, with the intake section plenum. When the flow structure within the plenum of the APU intake section is highly unsteady or turbulent such that flow conditions vary significantly across different regions of the plenum and/or over time, the surge-free operational range at which the compressor can operate for prolonged periods of time may be undesirably reduced and the overall performance of the APU may be negatively impacted. In many cases, the flow structure within the APU intake plenum can be stabilized by imparting the plenum with a relatively large volume and/or by adding baffles to allow mixing and diffusion of the APU inlet airflow and to avoid impingement of high velocity or high Mach number airflow on any structures present within the plenum; however, in certain instances, such as when the APU is required to be highly compact, imparting the APU intake plenum with such a large volume may be impractical.

There thus exists an ongoing need to provide embodiments of an APU or other GTE (e.g., a turboshaft engine) wherein highly unsteady, time-dependent, or turbulent flow structures within the intake section can be stabilized to bring about improvements in the overall engine performance, even in instances wherein the GTE is relatively compact and the intake section plenum encompasses a relatively small volume. It would also be desirable to provide embodiments of a multimodal APU or other GTE operable in a number of different modes to provide additional functionality, while also having a relatively stable or predictable flow structure within the intake section plenum across all operational modes. Other desirable features and characteristics of the present invention will become apparent from the subsequent Detailed Description and the appended Claims, taken in conjunction with the accompanying Drawings and the foregoing Background.

BRIEF SUMMARY

Embodiments of a Gas Turbine Engine ("GTE"), such as an auxiliary power unit, are provided. In one embodiment, the GTE includes a turbine section, a combustion section upstream of the turbine section, a compressor section upstream of the combustion section, and intake section upstream of the compressor section. The intake section includes a plenum, a first inlet fluidly coupled to the plenum, and a flow-obstructing structure projecting into the plenum and having an outer surface impinged by the airflow directed into the plenum through the first inlet during operation of the GTE. A first array of plasma actuators is disposed on flow-obstructing structure and, when activated, suppresses vortex shedding of the air flowing over the outer surface of the flow-obstructing structure.

Further provided are embodiments of a plasma flow-controlled intake system for deployment on a gas turbine engine having an intake section. The intake section includes a plenum, a first inlet fluidly coupled to the plenum, and a centerbody disposed within the plenum and impinged by airflow delivered into the plenum through the first inlet. The plasma flow-controlled intake system includes a first array of plasma actuators, which are disposed on the centerbody; and a controller, which is operably coupled to the first array of plasma actuators. The controller is configured to activate the first array of plasma actuators when airflow is received through the first inlet to suppress vortex shedding of air flowing over the outer surface of the centerbody.

BRIEF DESCRIPTION OF THE DRAWINGS

At least one example of the present invention will hereinafter be described in conjunction with the following figures, wherein like numerals denote like elements, and.

DETAILED DESCRIPTION

The following Detailed Description is merely exemplary in nature and is not intended to limit the invention or the application and uses of the invention. Furthermore, there is no intention to be bound by any theory presented in the preceding Background or the following Detailed Description. As appearing herein, the term "Auxiliary Power Unit" and the corresponding acronym "APU" are is defined broadly to refer to any gas turbine engine having at least one operational mode in which the APU generates auxiliary power, whether in the form of a mechanical, electrical, hydraulic, or pneumatic output. In one embodiment, the APU assumes the form of a system providing the combined functionality of a conventional APU, an emergency power unit, and an environmental control system (also referred to as a "Power Thermal Management System" or, more simply, a "PTMS"). The APU will typically, but need not always, be deployed onboard an aircraft or other vehicle. As further appearing herein, the term "flow line" denotes any combination of conduits, flow passages, and the like suitable for conducting airflow from one region of a device or system to another.

Figure 1:
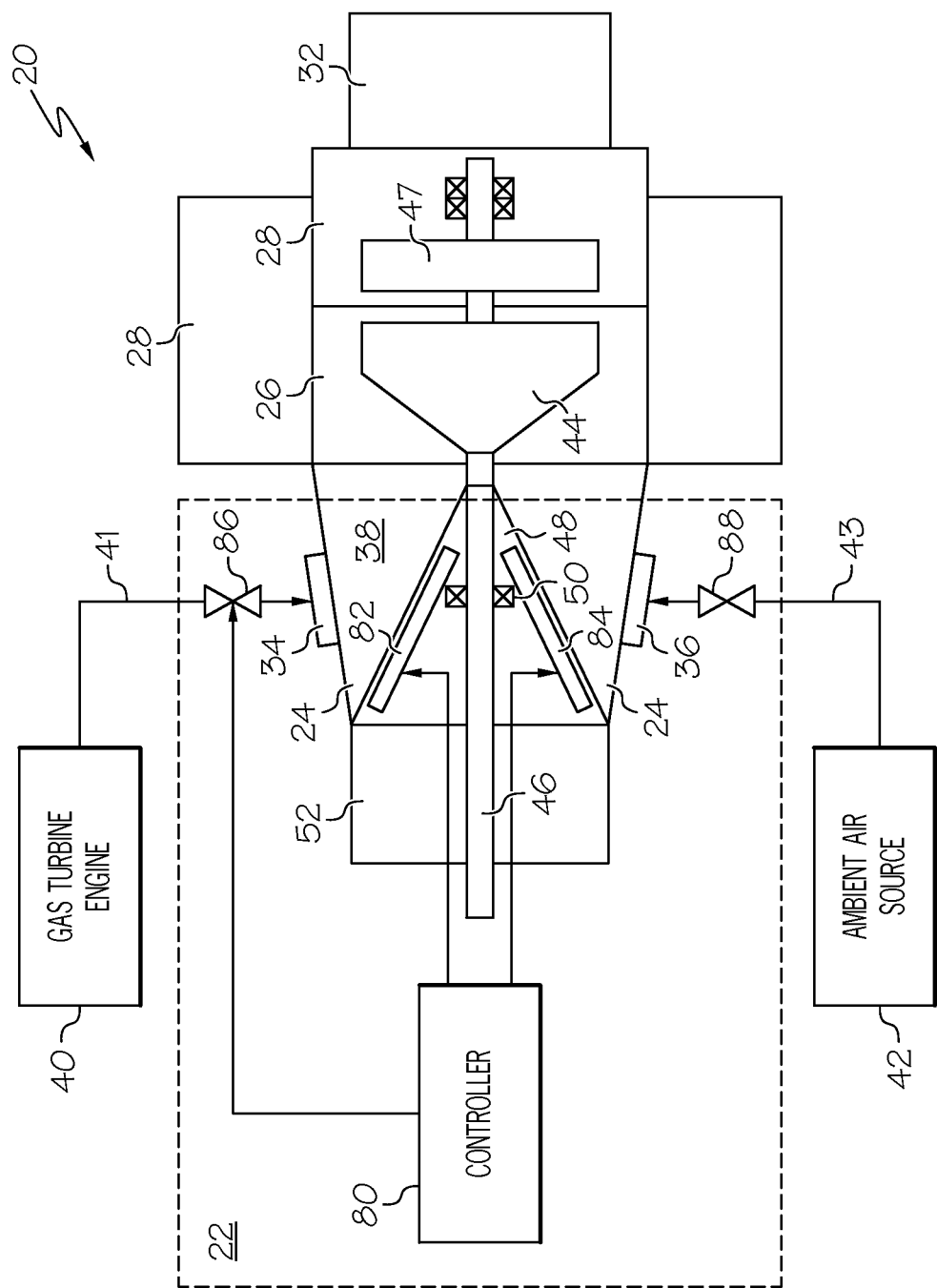
FIG. 1 is a schematic of a multimodal Auxiliary Power Unit ("APU") including a plasma flow-controlled intake system, as illustrated in accordance with a first exemplary embodiment of the present invention.

FIG. 1 is a schematic of a Gas Turbine Engine ("GTE") 20 having a plasma flow-controlled intake system 22, as illustrated in accordance with an exemplary embodiment of the present invention. In the illustrated example, GTE 20 is a non-propulsive gas turbine engine and, specifically, a multimodal Auxiliary Power Unit ("APU"). For this reason, GTE 20 will be referred to as "multimodal APU 20" or "APU 20" hereafter. It is emphasized, however, that embodiments of the plasma flow-controlled intake system 22 can be integrated into other types of gas turbine engines including, for example, turboshaft engines. In general, embodiments of the below-described plasma flow-controlled intake system are especially useful in instances wherein GTE 20 need be relatively compact, such as when GTE 20 assumes the form of an APU (e.g., a multimodal APU of the type described below) that is deployed within the wing of a fighter aircraft or carried by a Unmanned Aerial Vehicle ("UAV") or when GTE 20 assumes the form of a turboshaft engine deployed onboard a vehicle, such as a helicopter, tank, or other ground vehicle.

With continued reference to the exemplary embodiment shown in FIG. 1, APU 20 includes the follow sections fluidly coupled in flow series: (i) an intake section 24, (ii) a compressor section 26, (iii) a combustion section 28, (iv) a turbine section 30, and (v) an exhaust section 32. In the illustrated example wherein APU 20 is configured to operate in two or more modes, intake section 24 includes first and second sidewall inlets 34 and 36, which each direct airflow into a plenum 38 depending upon the particular mode in which APU 20 is operating. For example, as schematically indicated in FIG. 1, sidewall inlet 34 of intake section 24 may be fluidly coupled to the compressor section of a second GTE 40 (e.g., a main or propulsive GTE of an aircraft) by a flow line 41 and configured to receive pressurized airflow bled from the compressor section of GTE 40 when APU 20 is operating in a first mode; while sidewall inlet 36 may be fluidly coupled to a second air source, such as the ambient environment 42, by a flow line 43 and configured to receive airflow therefrom when APU 20 is operating in a second mode (described below). For this reason, sidewall inlet 34 may be referred to as "closed-loop inlet 34" herein, while sidewall inlet 36 may be referred to as "open-loop inlet 36." In further embodiments, intake section 24 may include a greater or lesser number of inlets; e.g., intake section 24 may include a single inlet that draws air from the ambient environment in embodiments wherein APU 20 operates in a single mode.

Compressor section 26 includes a single radial or centrifugal compressor in the form of an impeller 44. Impeller 44 is fixedly mounted to a shaft 46 utilizing, for example, a tie shaft coupling. Impeller 44 rotates with shaft 46 about the centerline or rotational axis 54 of APU 20 (identified in FIG. 2). In other embodiments, compressor section 26 of APU 20 may include one or more axial compressors in addition to or in lieu of impeller 44. Additionally, compressor section 26 may include a multi-stage centrifugal compressor where impeller 44 is associated with the first stage impeller. Turbine section 30 includes at least one turbine 47, which is likewise rotationally affixed to shaft 46 and located axially adjacent impeller 44. Shaft 46 extends through intake section 24 and is received by a central structure (referred to herein as "centerbody 48"), which projects into plenum 38 and houses a forward bearing assembly 50 supportive of shaft 46. The forward end portion of shaft 46 extends through and drives a forward APU module 52, which may provide a number of different functions, either separately or in combination, including, for example, main engine starting, power generation, and cooling airflow supply. As further indicated in FIG. 1, the forward end of shaft 46 may project from forward APU module 52 and may be utilized to drive other components and devices onboard the aircraft (or other platform) on which APU 20 is deployed.

During operation of APU 20, air is drawn into plenum 38 of intake section 24 through either inlet 34 or inlet 36. For example, when APU 20 is operating in a first mode, pressurized airflow bled from GTE 40 may be received through closed-loop inlet 34, while no airflow is received through open-loop inlet 36. Conversely, when APU 20 is operating in a second mode, airflow drawn from ambient air source 42 may be received through open-loop inlet 36, while no airflow is received through closed-loop inlet 34. Regardless of the particular inlet through which the airflow is received, the air supplied to plenum 38 flows from intake section 24 into compressor section 26. Within compressor section 26, the airflow is compressed by the rotating impeller 44 to raise the temperature and pressure of the airflow. The hot, compressed airflow is then supplied to combustion chamber(s) of combustion section 28 wherein the air is mixed with fuel and ignited. The combustive gasses expand rapidly and flow through turbine section 30 to drive the rotation of turbine 47, which drives further rotation of shaft 46 and impeller 44. The rotation of shaft 46 also provides the power output of APU 20, which may be utilized for various purposes, such as driving forward module 52. Finally, the combustive gas flow is exhausted from APU 20 through exhaust section 32.

Figure 2:
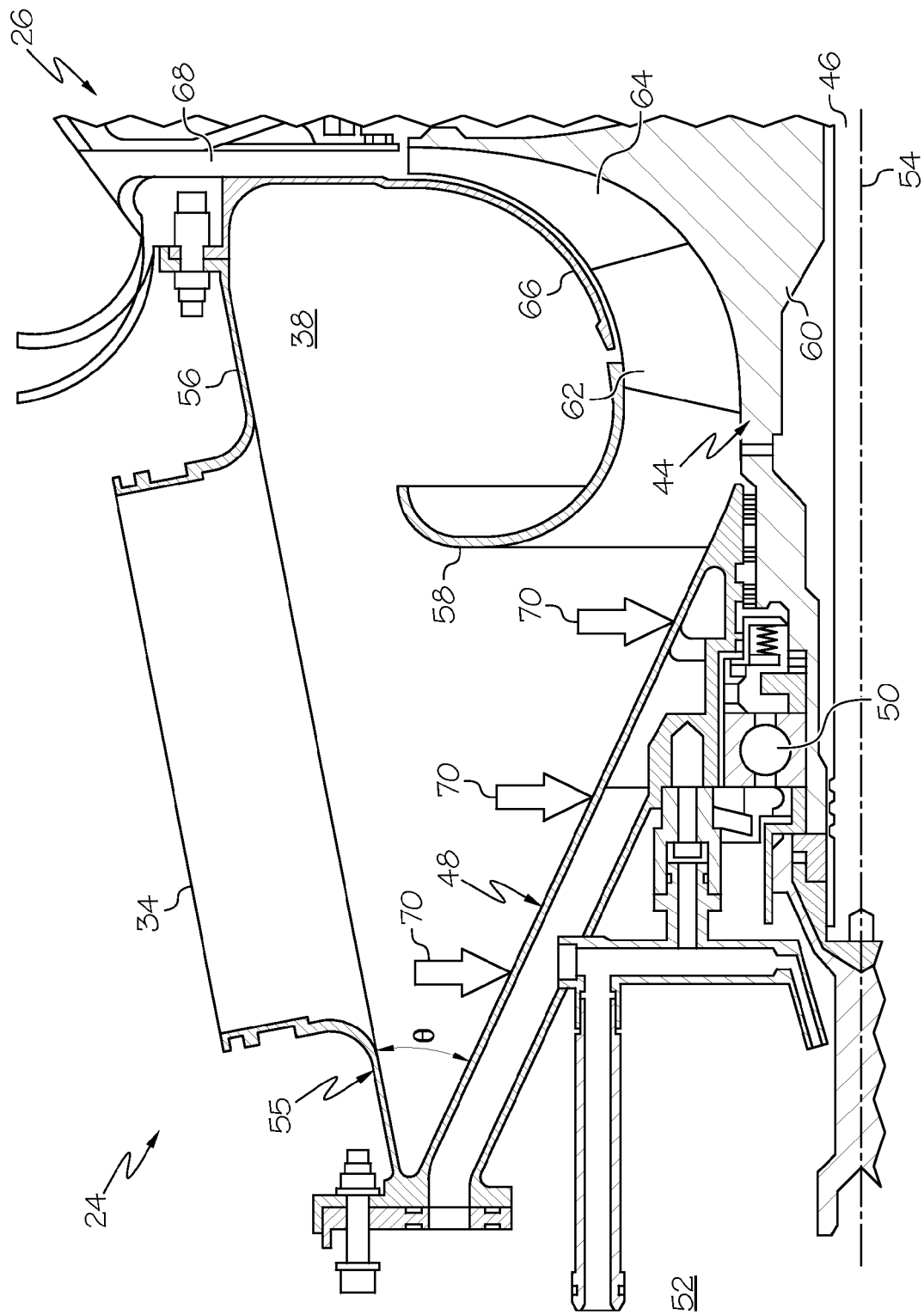
FIG. 2 is a cross-sectional view of the multimodal APU shown in FIG. 1 illustrating a portion of the intake section in greater detail (the plasma flow-controlled intake system not shown in FIG. 2 for clarity)

FIG. 2 provides a more detailed view of a portion of intake section 24 and compressor section 26 of APU 20, as taken in cross-section. Plasma flow-controlled intake system 22 is purposefully omitted from FIG. 2, but shown in FIG. 1 and FIGS. 6 and 7 (described below). Furthermore, only closed-loop inlet 34 is included within the illustrated portion of intake section 24 shown in FIG. 2; however, open-loop inlet 36 is similar to inlet 34 in structure (intake section 24 is generally axisymmetric about APU centerline 54) and, therefore, the following description applies equally thereto. As can be seen in FIG. 2, APU 20 includes a main housing assembly 55 having a generally conical outer plenum wall 56, which extends around APU centerline 54 to circumscribe and enclose plenum 38. Closed-loop inlet 34 is formed through outer plenum wall 56 at a location radially overlapping with centerbody 48; that is, at a location that aligns with centerbody 48, as taken along a radius of APU 20 orthogonal to centerline 54. In certain implementations, outer plenum wall 56 and centerbody 48 may be produced as a single or unitary (e.g., cast and machined) piece. This may be more fully appreciated by referring to FIG. 3, which illustrates outer plenum wall 56 and centerbody 48, as viewed in an aft-fore direction through the open aft end of intake section 24. Certain other conventionally-known structures are also shown in FIG. 3, such as a baffle 67.

Figure 3:
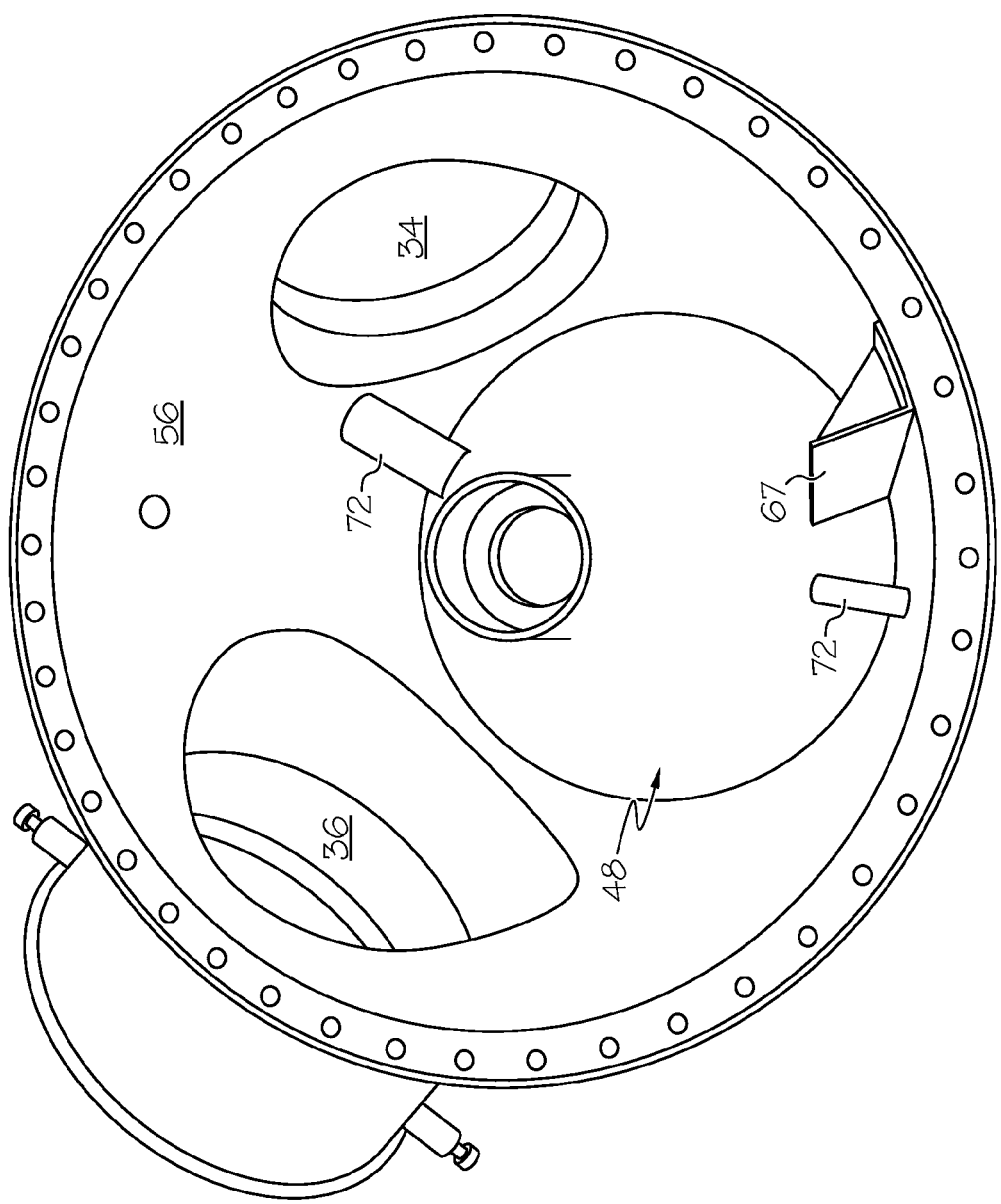
FIG. 3 is a perspective view illustrating the intake section housing and centerbody included in the intake section of the multimodal APU shown in FIG. 1.

FIGS. 2 and 3 illustrate several structures or components internal to intake section 24 and compressor section 26 of APU 20, which are excluded from the simplified schematic shown in FIG. 1. With reference to FIG. 2, these structures or components include a bellmouth structure 58, which is disposed upstream of impeller 44 and serves to consolidated and gently accelerate airflow when entering impeller 44. The aft end of centerbody 48 extends into bellmouth 58 and terminates adjacent the forward end of impeller 44, in an embodiment. APU 20 further includes a ported shroud 66, which is disposed around impeller 44 and serves to guide airflow from the forward or "inducer" section of impeller 44 to the aft or "exducer" section thereof. As further illustrated in FIG. 2, impeller 44 includes a central body or hub 60 and a number of primary impeller blades 62, which are angularly spaced about the circumference of hub 60 and extend radially outward therefrom. Primary impeller blades 62 wrap or twist around hub 60, when impeller 44 is viewed along rotational axis 54. Primary impeller blades 62 each extend essentially the entire length of hub 60. Impeller 44 may also include a number of truncated splitter blades 64, which extend radially from the exducer section of impeller 44 exclusively. One or more radially-extending diffuser conduits 68 are further provided downstream of impeller 44. During operation of APU 20, conduits 68 direct the hot, high pressure airflow discharged from the exducer section of impeller 44 into combustor section 28 (FIG. 1) for mixture with fuel and subsequent combustion, as previously described.

As noted above, outer plenum wall 56 may be imparted with a substantially conical geometry. In the exemplary embodiment shown in FIGS. 2 and 3, outer plenum wall 56 tapers upward when moving in a fore-aft direction toward impeller 44. Stated differently, the inner diameter of outer plenum wall 56 increases when moving in a fore-aft direction toward impeller 44. Centerbody 48 likewise has a substantially conical geometry, but tapers downward when moving in a fore-aft; that is, the outer diameter of centerbody 48 decreases when moving in a fore-aft direction toward impeller 44. The forward circumferential end portions of outer plenum wall 56 and centerbody 48 meet or join near the forward edge of inlet 34 and, as a result, collectively form a wedge shaped region. As identified in FIG. 2, this wedge shaped may have a predetermined angle θ. Angle θ is less than about 45° in an embodiment, but may be greater in further embodiments.

It should be noted that, in the illustrated example shown in FIGS. 1-3, APU 20 is highly compact in design and is consequently well-suited for usage within applications having limited spatial envelopes for deployment of the APU. Such applications may include, but are not limited, deployment within the wing or other spatially-restricted area of a fighter aircraft and deployment onboard a UAV. As a corollary, intake section 24 of APU 20 is also highly compact and the volume of plenum 38 is significantly reduced as compared to the intake section of an APU having a more typical design. Due to the compact design of intake section 24, centerbody 48 occupies a relatively large volume of the space enclosed by outer plenum wall 56 of main housing assembly 55. In this regard, the maximum outer diameter of conical centerbody 48, which could alternatively be imparted with a generally cylindrical geometry in certain embodiments (e.g., when plasma flow-controlled intake system 22 is integrated into a turboshaft engine), may be at least one eighth and, in certain cases, greater than one half the maximum inner diameter of plenum 38. Furthermore, the forward outer circumferential edge of centerbody 48 may reside closer to plenum wall 56 and, possibly, to inlets 34 and 36 than to centerline 54 (FIG. 2).

Due to the compact design of intake section 24, and the close proximity of inlets 34 and 36 to centerbody 48, high velocity airflow received through inlets 34 and 36 may impinge directly upon the outer surface of centerbody 48. This is generically illustrated in FIG. 2 for closed-loop inlet 34 wherein arrows 70 represent airflow received through inlet 34 as it impinges upon centerbody 48. The forward edge of inlet 34 and the forward portion of centerbody 48 are particularly close in proximity; and, therefore, the velocity of the airflow jet impinging upon this region of centerbody 48 (as represented by the leftmost arrow 70 in FIG. 2) may be especially high. After impinging upon centerbody 48, the APU inlet airflow navigates around the outer circumference of centerbody 48 and any other physical obstructions present within plenum 38, which are not provided for flow guidance purposes. Such other physical obstructions may include other structures that project into plenum 38 and block the natural flow path of the APU inlet airflow, such as service lines 72 (shown in FIG. 3) extending between centerbody 48 and outer plenum wall 56 to, for example, allow delivery of oil to bearing 50 (FIGS. 1 and 2) located within centerbody 48. Centerbody 48, service lines 72, and other such flow-blocking members are generically referred to herein as "flow-obstructing structures."

The impingement of the high velocity airflow upon and the flow of the APU inlet air around centerbody 48, service lines 72 (shown in FIG. 3), and any other flow-obstructing structures within plenum 38 can result in the creation of unstable, time-varying flow conditions within plenum 38. Most notably, vortex shedding may occur as the APU inlet airflow impinges upon and flows around the outer surface of centerbody 48 and any other flow-obstructing structures present within intake section 24. Depending upon their severity, the unsteady and time-varying flow conditions created within plenum 38 can prevent optimal operation of impeller 44 and, therefore, detract from the overall performance of APU 20. For example, such unsteady flow states may detract from the operational performance of APU 20 by reducing the surge-free operational range over which impeller 44 can be maintained during operation of APU 20, as described more fully below in conjunction with FIG. 4.

Figure 4:
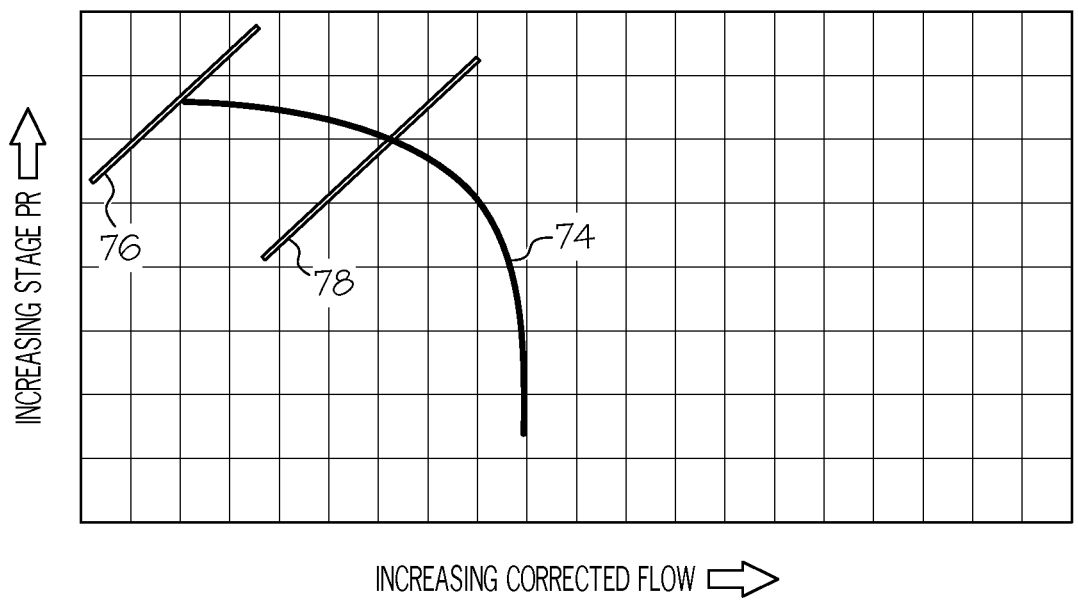
FIG. 4 is a graph of stage pressure ratio (vertical axis) versus corrected flow (horizontal axis) illustrating an exemplary operational characteristic of the impeller shown in FIGS. 1-2 and an optimal surge line at which the compressor (e.g., impeller) may be operated for prolonged periods of time due to the inclusion of the plasma flow-controlled intake system in the multimodal APU shown in FIG. 1.

FIG. 4 is a graph including a curve or profile 74 representative of the performance characteristic of impeller 44 (FIGS. 1 and 2), as illustrated in accordance with an exemplary and non-limiting embodiment. Here, the vertical axis denotes stage pressure ratio (outlet pressure over inlet pressure) and the horizontal axis denotes corrected flow (mass flow rate corrected to standard day conditions). Two surge lines are shown in FIG. 4: (i) an optimal surge line 76, and (ii) a sub-optimal surge line 78. Sub-optimal surge line 78 represents the surge-free operational limit at which impeller 44 can operate for prolonged time periods (essentially indefinitely), if APU 20 were not equipped with a plasma flow-controlled intake system. Conversely, optimal surge line 76 represents the surge-free operational limit at which impeller 44 can operate for limited time periods in instances wherein APU 22 is not equipped with plasma flow-controlled intake system 22 or intake system 22 is inactive. Without being bound by theory, it is believed that impeller 44 cannot sustain surge-free operation at optimal surge line 76 for prolonged time periods due to the time-varying unsteady flow states within plenum 38 and, most notably, due to the occurrence of vortex shedding around centerbody 48. As a result, without the provision of plasma flow-controlled intake system 22, it may become necessary to operate impeller 44 at or below sub-optimal surge line 78, thereby limiting the operational range and performance of impeller 44 and reducing the overall efficiency and load capability of APU 20.

Plasma flow-controlled intake system 22 serves to stabilize the unsteady or turbulent flow within plenum 38 to bring about improvements in the operational performance of APU 20. In preferred embodiments, plasma flow-controlled intake system 22, when active, suppresses vortex shedding around centerbody 48 (FIGS. 1-3); and, in so doing, creates a more uniform flow structure within plenum 38 with less variation over time. This enables continual operation of impeller 44 at or near optimal surge line 76 (FIG. 4) and, therefore, an improvement in the overall performance of APU 20. A more detailed description of plasma flow-controlled intake system 22 will now be provided in conjunction with FIG. 1 and FIGS. 5-7. The following description is provided by way of non-limiting example only; and it should be appreciated that other embodiments of plasma flow-controlled intake system 22 may differ in varying manners. For example, in the following description, plasma flow-controlled intake system 22 includes two arrays of plasma actuators, which are selectively activated depending upon the operational mode of multimodal APU 20; however, in embodiments wherein APU 20 operates in a single mode, plasma flow-controlled intake system 22 may include a single array of plasma actuators, which may be activated when APU 20 is operational.

Referring briefly once again to FIG. 1, plasma flow-controlled intake system 22 includes a controller 80, a first plasma actuator array 82, and a second plasma actuator array 84. Controller 80 is operably coupled to plasma actuator arrays 82 and 84. Additionally, controller 80 is operably coupled to at least one flow control valve, which regulates pressurized airflow between GTE 40 and closed-loop inlet 34 and/or between ambient air source 42 and open-loop inlet 36. For example, as shown in FIG. 1, controller 80 may be operably coupled to a remotely-actuated flow control valve 86, which is disposed within flow line 41 between GTE 40 and closed-loop inlet 34. Controller 80 may command an actuator included within valve 86 to move the valve element thereof between open and closed positions when APU 20 is operating in the first and second operational modes, respectively. An independently-actuated flow control valve 88 (e.g., a spring biased flapper valve) may be disposed within flow line 43 between ambient air source 42 and open-loop inlet 36 and may open and close in response to the pressure differential across valve 88. In actual implementations of APU 20, various other valves (e.g., check valves) and other components may be included in the larger system; but are not shown in FIG. 1 to avoid unnecessary obscuring the illustrated example of the invention.

The plasma actuator array or arrays included within plasma flow-controlled intake system 22 can be positioned on any flow-obstructing structure or structures present within plenum 38 including, for example, service lines 72 shown in FIG. 3. However, as indicated in FIG. 1, it is preferred that plasma actuator arrays 82 and 84 are disposed on selected locations of centerbody 48. As utilized herein, the term "disposed on" indicates that plasma actuator arrays 82 and 84 are affixed to, integrated into, embedded within, mounted to, or otherwise supported by centerbody 48. Plasma actuator arrays 82 and 84 each include at least two and will typically include a relatively large number of plasma control devices or plasma actuators. Plasma actuator arrays 82 and 84 may be implemented utilizing currently-known or later-developed plasma actuators of varying types. Generally, the plasma actuators included within arrays 82 and 84 can assume any form suitable for selectively generating plasma fields, which can provide the desired flow condition functions, such as suppressing vortex shedding as air flows over and around centerbody 48 (FIGS. 1-3) or a similar obstruction placed in the flow path of the intake airflow.

Figure 5:
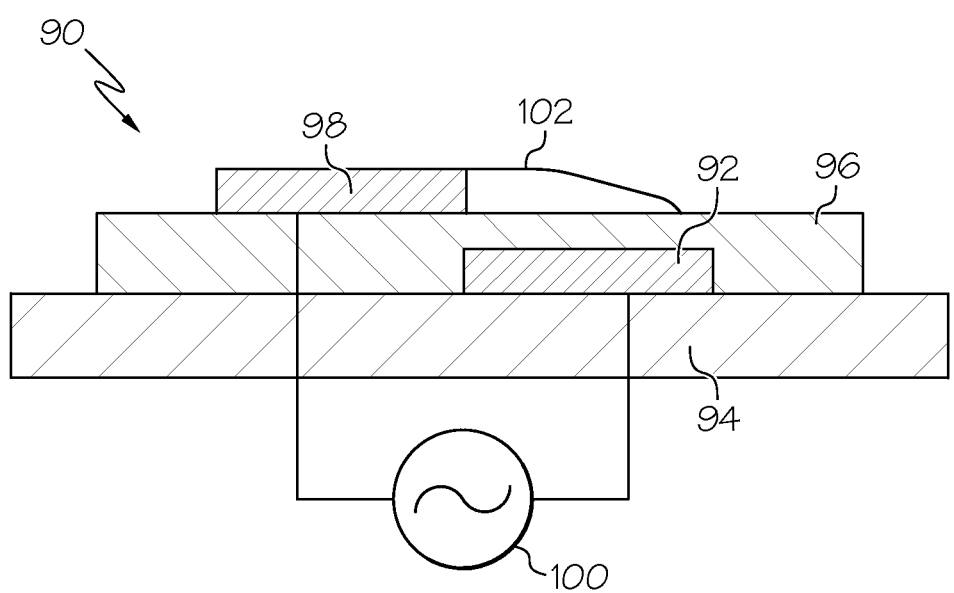
FIG. 5 is a simplified cross-sectional view of one plasma actuator suitable for inclusion in one or both of the plasma arrays of the plasma flow-controlled intake system shown in FIG. 1.

By way of non-limiting example, FIG. 5 provides a simplified cross-sectional view of a plasma actuator 90 that may be included within one or both of arrays 82 and 84 (FIG. 1). As shown in FIG. 5, plasma actuator 90 includes a bottom or buried electrode 92 disposed on substrate 94, which may be fabricated from silicon or another semiconductor material in an embodiment. Substrate 94 may, in turn, be affixed to the outer circumferential surface of centerbody 48, or embedded into centerbody 48 to provide a more flush installation, utilizing any suitable mounting hardware (e.g., racks, brackets, fasteners, and the like), non-hardware attachment means (e.g., adhesives or solder), or combinations thereof. A dielectric layer 96 (e.g., an oxide) is formed over substrate 94 and overlays buried electrode 92. A top or exposed electrode 98 is further formed over the upper surface of dielectric layer 96 near buried electrode 92; however, exposed electrode 98 is not located directly over buried electrode 92 and is instead offset or staggered therefrom, as taken along an axis orthogonal to the upper surface of dielectric layer 96. When a suitable alternating current voltage source 100 is applied across electrodes 92 and 98, a plasma field 102 is created over the region of dielectric layer 96 overlaying buried electrode 96 due to the discharge of ions and the ionization of the surrounding air to create a plasma gas. This plasma field can be utilized to direct the airflow along a desired path; or, in the case of plasma flow-controlled intake system 22, to minimize separation of the APU inlet airflow as it flows around centerbody 48 from the outer surface thereof to reduce vortex shedding, as described more fully below.

Figure 6:
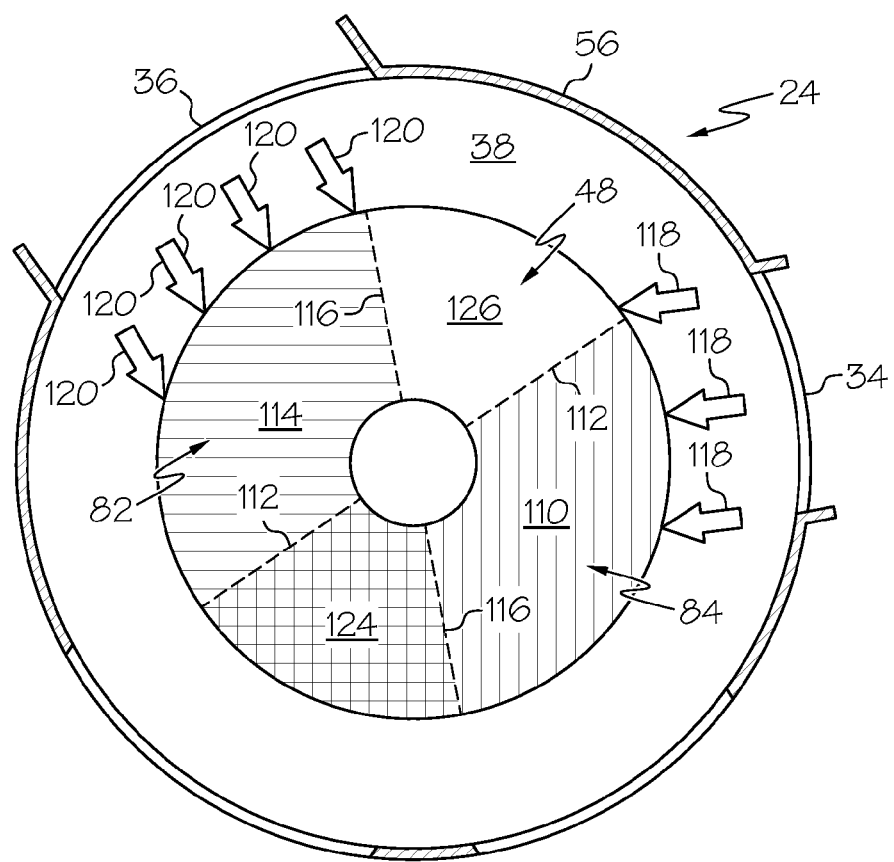
FIG. 6 is an end view of the APU intake section illustrating the locations on the centerbody at which the first and second plasma actuator arrays may be deployed.

The plasma gas generated by the plasma actuators (e.g., plasma actuator 90 shown in FIG. 5) within plasma arrays 82 and 84 (FIG. 1) can be utilized to suppress vortex shedding around centerbody 48 during operation of APU 20 and thereby stabilize unsteady flow structures within plenum 38. To reduce vortex shedding, each plasma actuator array 82 and 84 is ideally positioned substantially opposite the location at which high velocity airflow impinges upon centerbody 48 when received through inlet 34 or inlet 36, respectively. Further emphasizing this point, FIG. 6 illustrates one possible disposition of plasma actuator array 82 (as distributed over first patterned region 114 of centerbody 48 having boundaries 116) and of plasma actuator 84 (as distributed over a second patterned region 110 of centerbody 48 having boundaries 112). As can be seen in FIG. 6, plasma actuator array 82 is located substantially opposite closed-loop inlet 34 and, specifically, opposite the region of centerbody 48 impinged by high velocity airflow received through inlet 34 (represented in FIG. 4 by arrows 118; also referred to herein as the "first impingement zone"). Conversely, plasma actuator array 84 is located substantially opposite open-loop inlet 36 and, specifically, opposite the region of centerbody 48 impinged by high velocity airflow received through inlet 36 (represented in FIG. 4 by arrows 120; referred to herein as the "second impingement zone"). Stated differently, plasma actuator arrays 82 and 84 are disposed on a downstream regions or halves 114 and 110 of centerbody 48, as taken with respect to inlets 34 and 36, respectively. In the illustrated example wherein plasma actuator arrays 82 and 84 each span an approximately 180° arc, plasma actuator arrays 82 and 84 overlap in a shared intermediate region 124. Plasma actuator arrays 82 and 84 may be circumferentially spaced apart by a region 126 of centerbody 48 lacking plasma actuators and located substantially opposite shared intermediate region 124.

Figure 7:
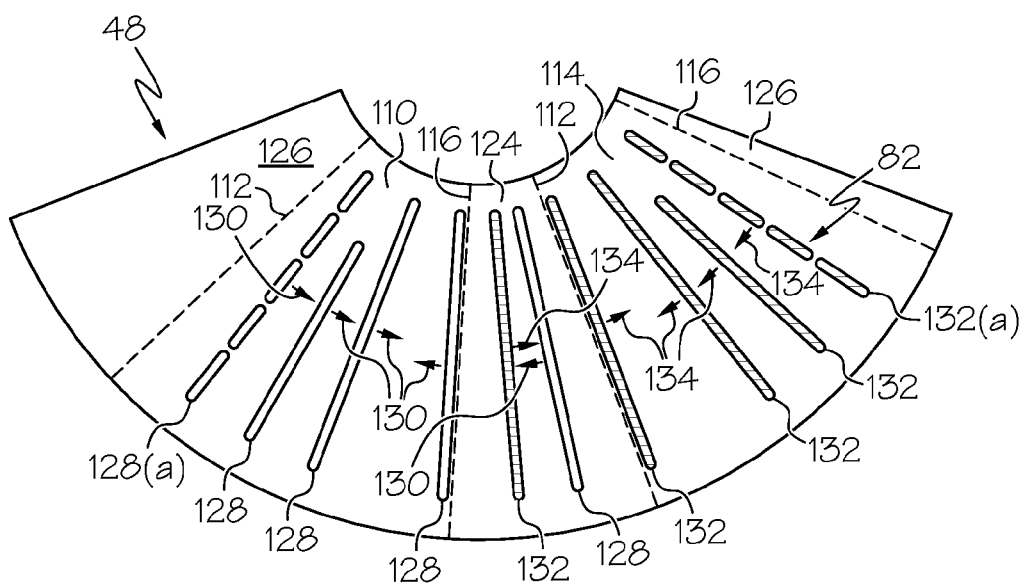
FIG. 7 is an end view of the centerbody shown in FIGS. 1-3 and 6 in an unfurled or flattened state illustrating one possible distribution of the plasma actuators included within the arrays of the plasma flow-controlled intake system shown in FIG. 1.

FIG. 7 illustrates one possible distribution of the plasma actuators included within arrays 82 and 84 over centerbody 48 (shown in an unfurled or flattened state). Here, plasma actuator array 84 includes a number of elongated plasma actuators 128 of the same or varying lengths, which are angularly spaced over region 110 of centerbody 48. In this case, and as indicated in FIG. 7 by arrows 130, actuators 128 are unidirectional devices and orientated such that the direction of the plasma field points toward the center of region 110; that is, toward a location on centerbody 48 that is diametrically opposite inlet 36 (FIG. 6). Similarly, plasma actuator array 82 includes a number of elongated plasma actuators 132 of the same or varying lengths, which are angularly spaced over region 114 of centerbody 48. As indicated in FIG. 7 by arrows 134, actuators 132 are unidirectional devices and orientated such that the direction of the plasma field points toward the center of region 114 (toward a location on centerbody 48 that is diametrically opposite inlet 34). Actuators 128 and actuators 132 are interspersed in shared region 124 of centerbody 48. In other embodiments, actuator arrays 82 and 84 may share common plasma actuators, which may be bi-directional devices capable of being controlled to generate plasma fields in either of two directions, as appropriate for the flow conditioning requirements of the particular mode in which APU 20 is operating.

As shown in FIG. 7, actuators 128 and 132 may assume the form of longitudinally-elongated devices that each extend continuously along the length of centerbody 48 without interruption; e.g., actuators 128 and 132 may each have length equal to or greater than one half the length of centerbody 48, in an embodiment. Alternatively, as indicated in FIG. 7 for two actuators 128(*a*) and 132(*a*), some or all of actuators 128 and 132 may be segmented along their respective lengths. In this case, each of plasma actuators 128 and 132 may be effectively divided into multiple, separately-actuatable plasma actuators, which may be arranged in a row or a staggered formation along the length of centerbody 48. In such embodiments, the longitudinally-segmented plasma actuators may be independently controlled to better compensate for three dimensional effects created by the conical geometry of centerbody 48. Whether assuming such an elongated continuous (e.g., bar-shaped) form or a segmented form, plasma actuators 128 and 132 can be optimized for steady-state operation, pulse operation, or a combination thereof. Actuators 128 and 132 can also be frequency and/or phase optimized, as appropriate, for providing vortex shedding suppression or other desired flow conditions effects within plenum 38 of intake section 24 during operation of APU 20. Additionally, plasma actuators 128 and 132 may have a placement orientation along centerbody 48 that is different from the centerline 54 placement orientations shown in FIG. 7.

In the illustrated example wherein APU 20 is a multimodal APU, airflow may be supplied to plenum 38 (FIGS. 1, 2, and 6) through open-loop inlet 36 when APU 20 is operating in a first mode and through closed-loop inlet 34 when APU 20 is operating in a second mode. Controller 80 (FIG. 1) supports such bi-modal operation of APU 20 by commanding flow control valve 86 (FIG. 1) to move between closed and open positions in the first and second operational modes, respectively. Additionally, controller 80 also selectively energizes plasma actuator arrays 82 and 84 depending upon the present operational mode of APU 20 and the particular inlet through which airflow is received. Specifically, in the operational mode wherein valve 86 is commanded closed such that no airflow is received through closed-loop inlet 34, while airflow is received through open-loop inlet 36, controller 80 activates plasma array 84 positioned substantially opposite open-loop inlet 36 (and deactivates plasma array 82, if necessary) to suppress vortex shedding of the air flowing over and around centerbody 48 and thereby stabilize the flow structure within plenum 38. Conversely, in the operational mode wherein valve 86 is commanded open such that no airflow is received through open-loop inlet 36, while pressurized airflow is received through closed-loop inlet 34, controller 80 activates plasma array 82 positioned substantially opposite closed-loop inlet 34 (and deactivates plasma array 84, if necessary) to suppress vortex shedding of the air flowing over centerbody 48 and again stabilize the flow structure within plenum 38. In this manner, plasma flow-controlled intake system 22 provides improved flow stability within plenum 38 across the multiple operational modes of APU 20 by specifically tailoring or correlating which plasma actuators are activated at a particular time with the particular inlet through which airflow is supplied to plenum 38 of intake section 24.

The foregoing has thus provided embodiments of a gas turbine engine having a plasma flow-controlled intake section useful in stabilizing highly unsteady or turbulent flow structures within the intake section (and particularly useful in suppressing vortex shedding around large flow-obstructing structures) to bring about improvements in the overall engine performance, even in instances wherein the GTE is relatively compact by design and the intake section plenum encompasses a relatively small volume. In the above-described exemplary embodiment, the plasma flow-controlled intake system was integrated into a multimodal APU operable in a number of different modes during which the APU intake section receives airflow through different inlets. In this case, the plasma flow-controlled intake system may include multiple plasma actuator arrays, which are selectively activated depending upon the current operational mode of the APU and the particular inlet or inlets through which airflow is received into the intake plenum. In further embodiments, the APU may operate in a single mode; and the plasma flow-controlled intake system may include a single plasma actuator array, which is activated continually or at selected times during operation of the APU. Furthermore, while primarily described above in the context of an APU, it will be appreciated that embodiments plasma flow-controlled intake system can employed within various different types of gas turbine engine. For example, in further embodiments, the plasma flow-controlled intake system may be integrated into a turboshaft engine, in which case the above-described conical centerbody may be replaced by a generally cylindrical centerbody that carries a shaft through the engine's inlet plenum and to a transmission.

While multiple exemplary embodiments have been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set-forth in the appended Claims.

What is claimed is:

1. A Gas Turbine Engine ("GTE"), comprising: a turbine section; a combustion section upstream of the turbine section; a compressor section upstream of the combustion section; and an intake section upstream of the compressor section, the intake section comprising: a plenum; a first inlet fluidly coupled to the plenum; a centerbody projecting into the plenum and having an outer surface impinged by airflow directed into the plenum through the first inlet during operation of the GTE; an outer plenum wall circumscribing the plenum, the first inlet formed through the outer plenum wall at a first location radially overlapping with the centerbody; a first array of plasma actuators disposed on the centerbody and, when activated, suppressing vortex shedding of air flowing over and around the outer surface, the first array of plasma actuators positioned substantially opposite a second location at which airflow impinged the centerbody when directed into the plenum through the first inlet.

2. The GTE of claim 1 wherein the centerbody is substantially co-axial with the centerline of the GTE.

3. The GTE of claim 2 wherein the centerline of first inlet is substantially perpendicular to longitudinal axis of centerbody.

4. The GTE of claim 2 further comprising:
a housing assembly enclosing the turbine section, the combustion section, the compressor section, and the intake section; and
a shaft rotatably mounted in the housing assembly and extending through the centerbody.

5. The GTE of claim 4 further comprising a forward bearing assembly supporting the shaft and disposed within the centerbody.

6. The GTE of claim 2 wherein the outer surface is conical.

7. The GTE of claim 5 wherein a maximum outer diameter of the centerbody is greater than one eighth a maximum inner diameter of the plenum and less than the maximum inner diameter of the plenum.

8. The GTE of claim 5 wherein an outer diameter of the centerbody decreases in a fore-aft direction, and wherein the intake section further comprises an outer circumferential wall bounding an outer circumference of the plenum and increasing in diameter in the fore-aft direction.

9. The GTE of claim 8 wherein a forward circumferential edge portion of the centerbody and a forward end portion of the outer circumferential wall converge in the aft-fore direction.

10. The GTE of claim 1 wherein the intake section further comprises: a second inlet fluidly coupled to the plenum; and a second array of plasma actuators disposed on the centerbody.

11. The GTE of claim 10 wherein the first inlet is an open loop inlet, and wherein the second inlet is a closed loop inlet.

12. The GTE of claim 10 further comprising a controller operably coupled to the first array of plasma actuators and the second array of plasma actuators and configured to: (i) activate the first array of plasma actuators when airflow is directed into the plenum through the first inlet, and (ii) activate the second array of plasma actuators when airflow is directed into the plenum through the second inlet.

13. The GTE of claim 12 wherein the controller is further configured to: (i) deactivate the first array of plasma actuators, if active, when airflow through the first inlet ceases, and (ii) deactivate the second array of plasma actuators, if active, when airflow through the first inlet ceases.

14. The GTE of claim 2 wherein the compressor section comprises a compressor, and wherein the aft end of centerbody terminates adjacent a forward end of the compressor.

15. The GTE of claim 1 wherein the first array of plasma actuators generates plasma fields when activated, and wherein the first array of plasma actuators is positioned such that the plasma fields point toward a third location on the centerbody that is substantially diametrically opposite the first inlet.

16. A Gas Turbine Engine ("GTE"), comprising: a turbine section; a combustion section upstream of the turbine section; a compressor section upstream of the combustion section; an intake section upstream of the compressor section, the intake section comprising: an intake assembly housing having first and second sidewall inlets; a centerbody disposed within the intake assembly housing and impinged by airflow received through the first and second sidewall inlets; a first plasma actuator array mounted on the centerbody at a first location substantially opposite the first sidewall inlet; and a second plasma actuator array mounted on the centerbody at a second location substantially opposite the second sidewall inlet; and a controller operably coupled to the first and second plasma actuator arrays, the controller configured to active (i) the first plasma actuator array when airflow is received through the first sidewall inlet, and (ii) the second plasma actuator array when airflow is received through the second sidewall inlet.

17. The GTE of claim 16 wherein at least a portion of the first plasma actuator array and the second plasma actuator array overlap.

18. A plasma flow-controlled intake system for deployment on a gas turbine engine having an intake section, the intake section comprising a plenum, a first inlet fluidly coupled to the plenum, a second inlet fluidly coupled to the plenum, and a centerbody disposed within the plenum and impinged by airflow delivered into the plenum through the first inlet and the second inlets, the gas turbine engine operable in a first operational mode wherein airflow is directed into the plenum through the first inlet and a second operational mode wherein the airflow is directed into the plenum through the second inlet, the plasma flow-controlled intake system further comprising: a first array of plasma actuators disposed on the centerbody; and a second array of plasma actuators disposed on the centerbody; a controller coupled to the first and second arrays of plasma actuators, the controller activating the first array of plasma actuators when the gas turbine engine operates in the first operational mode and activating the second array of plasma actuators when the gas turbine engine operates in the second operational mode to suppress vortex shedding of airflowing over an outer surface of the centerbody.

19. The plasma flow-controlled intake system of claim 18 wherein the first array of plasma actuators is disposed on the centerbody at a location substantially opposite the first inlet.

* * * * *